(12) United States Patent
Park et al.

(10) Patent No.: US 12,078,506 B2
(45) Date of Patent: Sep. 3, 2024

(54) REGION SEGMENTATION APPARATUS AND METHOD FOR MAP DECOMPOSITION OF ROBOT

(71) Applicants: YUJIN ROBOT CO., LTD., Incheon (KR); Miele & Cie. KG, Gütersloh (DE)

(72) Inventors: Seong Ju Park, Incheon (KR); Chang Soo Kim, Incheon (KR); Ji Gwan Park, Incheon (KR); Jin Baek Kim, Incheon (KR); Dong Hyeon Seo, Incheon (KR)

(73) Assignees: Yujin Robot Co., Ltd., Incheon (KR); Miele & Cie. KG, Götersloh (DE)

( * ) Notice: Subject to any disclaimer, the term of this patent is extended or adjusted under 35 U.S.C. 154(b) by 162 days.

(21) Appl. No.: 17/682,343

(22) Filed: Feb. 28, 2022

(65) Prior Publication Data

US 2022/0282991 A1    Sep. 8, 2022

(30) Foreign Application Priority Data

Mar. 2, 2021  (KR) .......................... 10-2021-0027648
Jun. 7, 2021  (KR) .......................... 10-2021-0073684

(51) Int. Cl.
*G01C 21/00* (2006.01)
*G01S 17/89* (2020.01)

(52) U.S. Cl.
CPC .......... *G01C 21/3837* (2020.08); *G01S 17/89* (2013.01)

(58) Field of Classification Search
CPC ............ G01C 21/3837; G01C 21/3867; G01C 21/383; G01S 17/89
See application file for complete search history.

(56) References Cited

U.S. PATENT DOCUMENTS

| | | | |
|---|---|---|---|
| 11,274,929 B1 * | 3/2022 | Afrouzi | G05D 1/0219 |
| 11,348,269 B1 * | 5/2022 | Ebrahimi Afrouzi | A47L 11/4013 |
| 11,467,605 B2 * | 10/2022 | Palla | G05D 1/0291 |
| 2008/0273791 A1 * | 11/2008 | Lee | G05D 1/0274 382/173 |
| 2013/0266223 A1 * | 10/2013 | Zhang | G06T 7/187 382/173 |
| 2018/0075643 A1 * | 3/2018 | Sequeira | G06T 7/20 |
| 2018/0281191 A1 * | 10/2018 | Sinyavskiy | G05D 1/0214 |
| 2019/0035100 A1 * | 1/2019 | Ebrahimi Afrouzi | G01S 17/86 |

(Continued)

FOREIGN PATENT DOCUMENTS

| KR | 10-0791384 B1 | 1/2008 |
|---|---|---|
| KR | 10-2016-0036008 A | 4/2016 |

OTHER PUBLICATIONS

"Sebastian Thrun, Integrating Grid-Based and Topological Maps for Mobile Robot Navigation, Aug. 1996, Proceedings of the Thirteenth National Conference on Artificial Intelligence" (Year: 1996).*

(Continued)

*Primary Examiner* — Lail A Kleinman
(74) *Attorney, Agent, or Firm* — BROADVIEW IP LAW, PC

(57) ABSTRACT

The region segmentation apparatus and method for map decomposition of a robot according to the exemplary embodiment of the present disclosure segment the grid map into a plurality of regions in consideration of the graphic characteristic of the space and obstacles disposed in the space.

15 Claims, 14 Drawing Sheets

(56) References Cited

U.S. PATENT DOCUMENTS

2020/0089255 A1* 3/2020 Kolling ............... G05D 1/0219
2021/0041889 A1* 2/2021 Chen ................... G06V 20/36
2021/0089040 A1* 3/2021 Ebrahimi Afrouzi .......................
                                                              G05D 1/0248

OTHER PUBLICATIONS

"Kai M. Wurm, Coordinated Multi-Robot Exploration using a Segmentation of the Environment, Sep. 2008, 2008 IEEE/RSJ International Conference on Intelligent Robots and Systems" (Year: 2008).*

Non-Final Office Action for KR10-2021-0073684 by Korean Intellectual Property Office dated Oct. 30, 2022.

Blochliger, Fabian et al. "Topological Mapping and Navigation Based on Visual SLAM Maps." Youtube Video. <https://www.youtube.com/watch?v=UokjxSLTcd0> Sep. 19, 2017.

* cited by examiner (a)

(b)

(a)

(b)

(a)

(b)

(c)

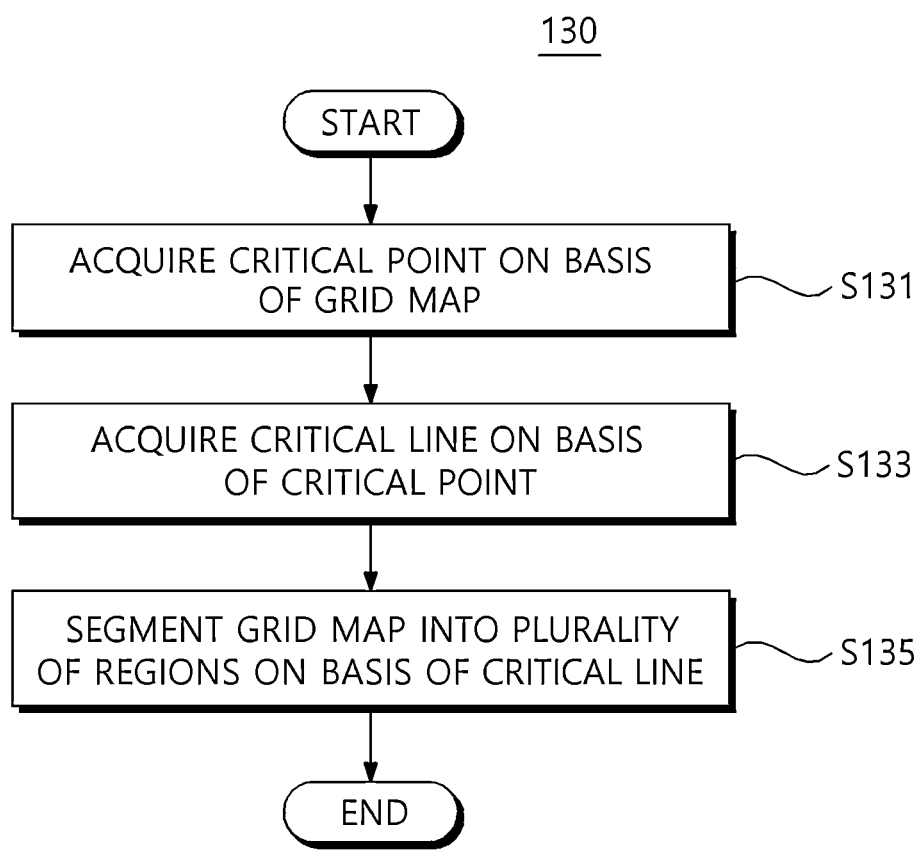

REGION SEGMENTATION APPARATUS AND METHOD FOR MAP DECOMPOSITION OF ROBOT

CROSS-REFERENCE TO RELATED APPLICATIONS

This application is based on and claims priority under 35 U.S.C. 119 to Korean Patent Application No. 10-2021-0027648 filed in the Korean Intellectual Property Office on Mar. 2, 2021, and Korean Patent Application No. 10-2021-0073684 filed in the Korean Intellectual Property Office on Jun. 7, 2021, the entire contents of which are herein incorporated by reference in its entirety.

BACKGROUND

Field

The present disclosure relates to a region segmentation apparatus and method for map decomposition of a robot, and more particularly, to an apparatus and a method for segmenting a grid map into a plurality of regions.

Description of the Related Art

When people clean their house, instead of moving around several rooms to clean, they separate spaces according to the structure (rooms or furniture) of the house and sequentially clean the individual spaces. Further, when the people clean a sufficiently large space such as a large living room and plaza, they automatically segment a predetermined area or a space according to the layout of the furniture.

When a robot thinks and behaves like a human, the robot is usually judged to be smart. Accordingly, the cleaning robot performs an operation of segmenting and cleaning a space similarly to the human.

SUMMARY

An objective to be achieved by the present disclosure is to provide an apparatus and a method for segmenting a region for map decomposition of a robot which segments a grid map into a plurality of regions in consideration of a graphic characteristic of the space and obstacles disposed in the space.

Other and further objectives of the present invention which are not specifically described can be further considered within the scope easily deduced from the following detailed description and the effect.

In order to achieve the above-described objects, according to an aspect of the present disclosure, a region segmentation apparatus for map decomposition of a robot includes a map building unit which builds a grid map; and a map segmentation unit which segments the grid map built by the map building unit into a plurality of regions.

Here, the region segmentation unit includes: a critical point acquiring module which acquires a critical point on the basis of the grid map; a critical line acquiring module which acquires a critical line on the basis of the critical point acquired by the critical point acquiring module; and a region acquiring unit which segments the grid map into a plurality of regions on the basis of the critical line acquired by the critical line acquiring module.

Here, the critical point acquiring module acquires an obstacle distance map on the basis of a shortest distance of each pixel located in the grid map to an obstacle, acquires a topology on the basis of the obstacle distance map, and acquires the critical point on the basis of the topology.

Here, the critical point acquiring module acquires points having the same interval to the obstacle located at the left and the right on the basis of the obstacle distance map, acquires the topology on the basis of the acquired points, acquires an intersecting point and an end point on the basis of the topology, and acquires the critical point on the basis of the acquired intersecting point and end point.

Here, the critical line acquiring module acquires the critical line which segments the space on the basis of the critical point using the topology acquired on the basis of the obstacle distance map corresponding to the grid map.

Here, the critical line acquiring module acquires the critical line using a difference between intervals from obstacles located at the left and right, while moving from one critical point to another critical point according to the topology.

Here, the critical line acquiring module acquires the critical line on the basis of a point at which the difference between intervals from the obstacles located at the left and right is larger than a predetermined first reference value and acquires the critical line on the basis of a start point and an end point at which the difference between intervals from the obstacles located at the left and right is constantly maintained within a predetermined second reference value.

Here, the region acquiring module acquires a plurality of labels corresponding to the grid map on the basis of the critical line and acquires a plurality of regions corresponding to the grid map by combining the labels on the basis of an inter-label connectivity.

Here, the region acquiring module acquires a label in an adjacent location, for each of the plurality of labels, while moving along an outline of the label to acquire the inter-label connectivity and combines the labels using the inter-label connectivity on the basis of a predetermined combining condition.

Here, the predetermined combining condition includes a first combining condition that merges a target label having a size which is smaller than a predetermined minimum size into an adjacent label having a largest adjacent part, among adjacent labels which are adjacent to the target label, a second combining condition which merges the target label into one adjacent label which is adjacent to all the outlines of the target label, and a third combining condition which merges the target label into an adjacent label when a size of an adjacent part of the target label and the adjacent label adjacent to the target label is larger than a predetermined reference size.

In order to achieve the above-described objects, according to another aspect of the present disclosure, a region segmentation method for map decomposition of a robot includes building a grid map; and segmenting the grid map into a plurality of regions.

Here, the segmenting of the grid into a plurality of regions includes: acquiring a critical point on the basis of the grid map; acquiring a critical line on the basis of the critical point; and segmenting the grid map into a plurality of regions on the basis of the critical line.

Here, in the acquiring of a critical point, an obstacle distance map is acquired on the basis of a shortest distance to an obstacle of each pixel located in the grid map, a topology is acquired on the basis of the obstacle distance map, and the critical point is acquired on the basis of the topology.

Here, in the acquiring of a critical line, the critical line which segments a space is acquired on the basis of the critical point using a topology acquired on the basis of an obstacle distance map corresponding to the grid map.

In order to achieve the aforementioned technical object, a computer program according to the exemplary embodiment of the present disclosure is stored in a computer-readable recording medium to execute any one of the aforementioned region segmentation method for map decomposition of a robot on a computer.

According to the region segmentation apparatus and method for map decomposition of a robot according to the exemplary embodiment of the present disclosure, the grid map may be segmented into a plurality of regions in consideration of the graphic characteristic of the space and obstacles disposed in the space.

The effects of the present invention are not limited to the technical effects mentioned above, and other effects which are not mentioned can be clearly understood by those skilled in the art from the following description

BRIEF DESCRIPTION OF THE DRAWINGS

FIG. 14 is a flowchart for explaining sub steps of a region segmenting step illustrated in FIG. 13.

DETAILED DESCRIPTION OF THE EMBODIMENT

Figure 1:
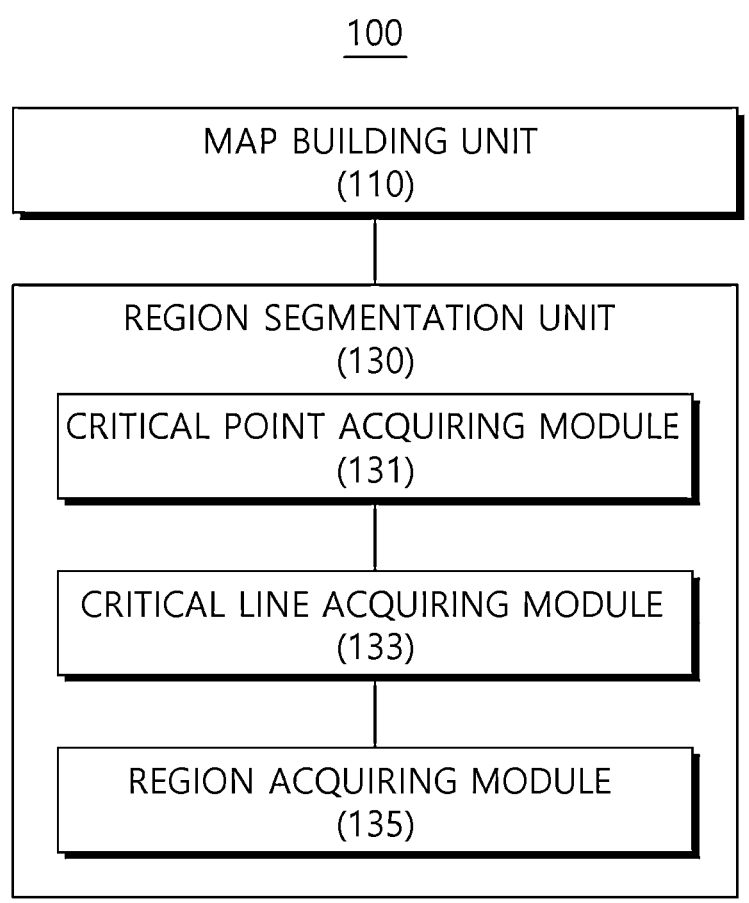
FIG. 1 is a block diagram illustrating a region segmentation apparatus for map decomposition of a robot according to an exemplary embodiment of the present disclosure.

Hereinafter, embodiments of the present disclosure will be described in detail with reference to the accompanying drawings. Advantages and characteristics of the present invention and a method of achieving the advantages and characteristics will be clear by referring to exemplary embodiments described below in detail together with the accompanying drawings. However, the present invention is not limited to exemplary embodiments disclosed herein but will be implemented in various different forms. The exemplary embodiments are provided by way of example only so that a person of ordinary skilled in the art can fully understand the disclosures of the present invention and the scope of the present invention. Therefore, the present invention will be defined only by the scope of the appended claims. Like reference numerals indicate like elements throughout the specification.

Unless otherwise defined, all terms (including technical and scientific terms) used in the present specification may be used as the meaning which may be commonly understood by the person with ordinary skill in the art, to which the present invention belongs. It will be further understood that terms defined in commonly used dictionaries should not be interpreted in an idealized or excessive sense unless expressly and specifically defined.

In the specification, the terms "first" or "second" are used to distinguish one component from the other component so that the scope should not be limited by these terms. For example, a first component may be referred to as a second component, and similarly, a second component may be referred to as a first component.

In the present specification, in each step, numerical symbols (for example, a, b, and c) are used for the convenience of description, but do not explain the order of the steps so that unless the context apparently indicates a specific order, the order may be different from the order described in the specification. That is, the steps may be performed in the order as described or simultaneously, or an opposite order.

In this specification, the terms "have", "may have", "include", or "may include" represent the presence of the characteristic (for example, a numerical value, a function, an operation, or a component such as a part"), but do not exclude the presence of additional characteristic.

The term "~unit" used in the specification refers to a software or hardware component such as a field programmable gate array (FPGA) or an ASIC and "~unit" performs some functions. However, "~unit" is not limited to the software or the hardware. "~unit" may be configured to be in an addressable storage medium or may be configured to reproduce one or more processors. Accordingly, as an example, "~unit" includes components such as software components, object oriented software components, class components, and task components, processes, functions, attributes, procedures, subroutines, segments of a program code, drivers, a firmware, a microcode, a circuit, data structures, and variables. A function which is provided in the components and "~units" may be combined with a smaller number of components and "~units" or further divided into additional components and "~units".

Hereinafter, an exemplary embodiment of a region segmentation apparatus and method for map decomposition of a robot according to the present disclosure will be described in detail with reference to the accompanying drawings.

First, a region segmentation apparatus for map decomposition of a robot according to an exemplary embodiment of the present disclosure will be described with reference to FIGS. 1 to 12.

Figure 2:
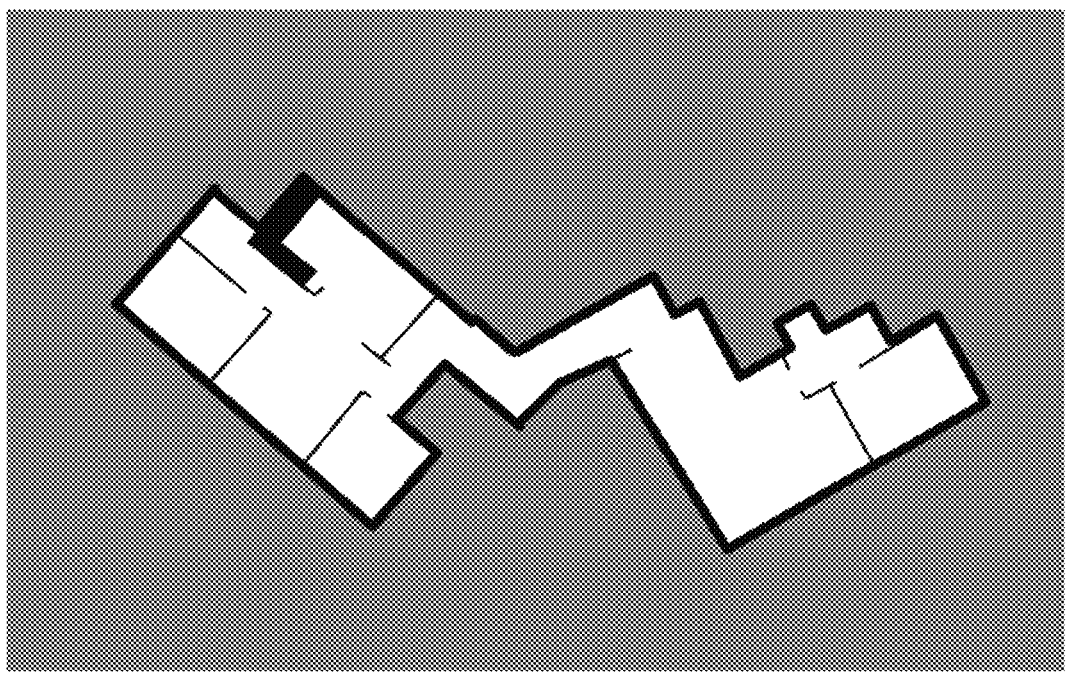
FIG. 2 is a view illustrating an example of a grid map according to an exemplary embodiment of the present disclosure.
Figure 3:
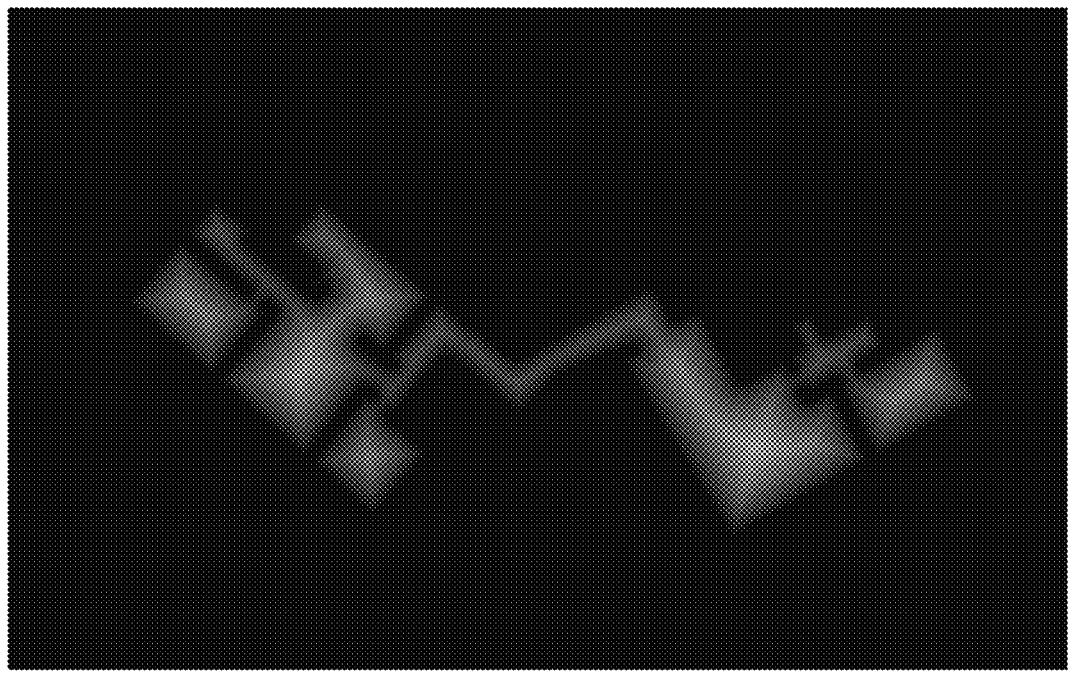
FIG. 3 is a view illustrating an example of an obstacle distance map according to an exemplary embodiment of the present disclosure to illustrate an obstacle distance map corresponding to the grid map illustrated in FIG. 2.
Figure 4:
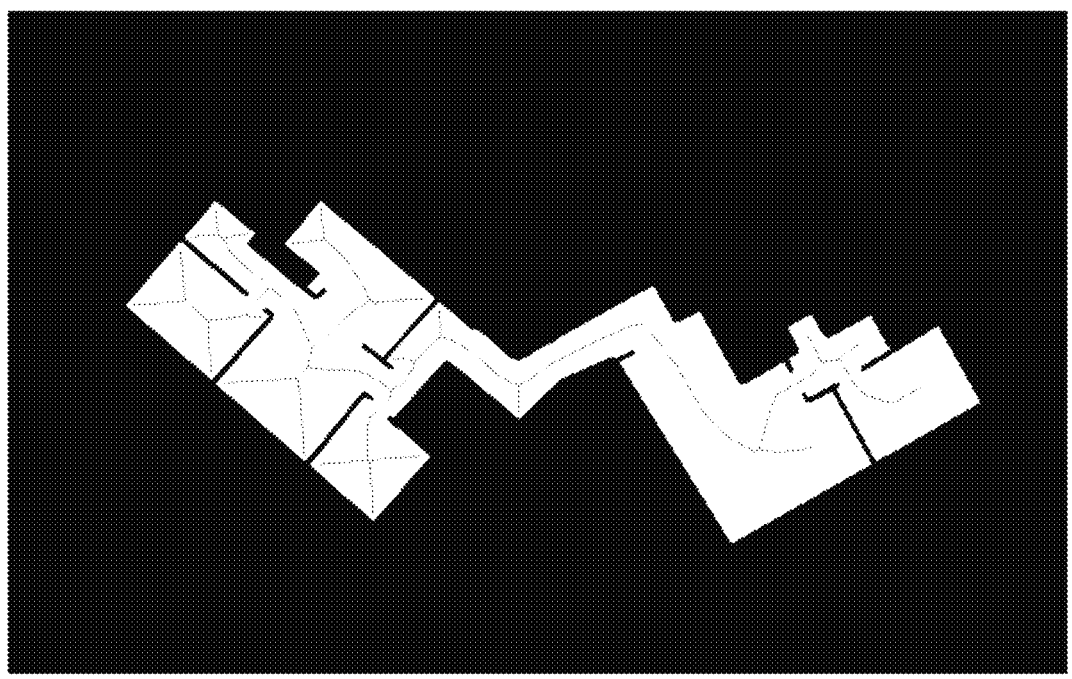
FIG. 4 is a view illustrating an example of a topology according to an exemplary embodiment of the present disclosure to illustrate a topology corresponding to the obstacle distance map illustrated in FIG. 3.
Figure 5:
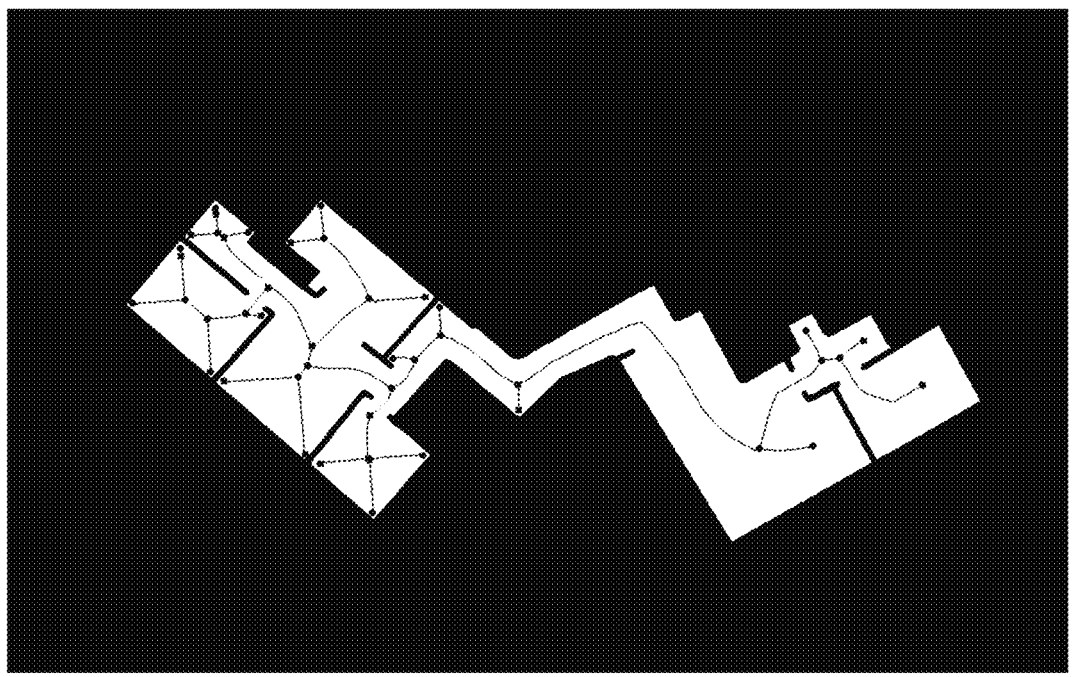
FIG. 5 is a view illustrating an example of a critical point according to an exemplary embodiment of the present disclosure to illustrate a critical point corresponding to the topology illustrated in FIG. 4.
Figure 6:
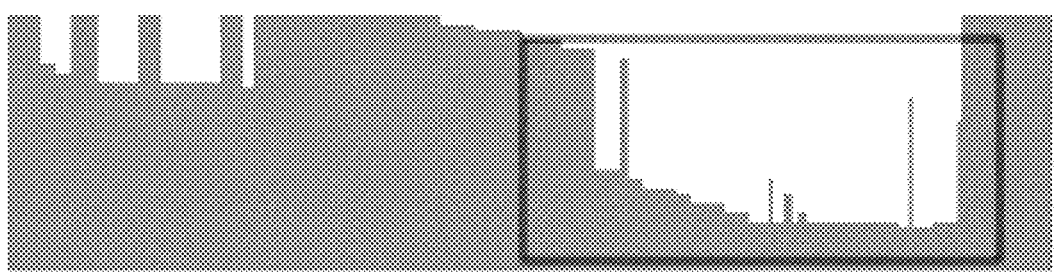
FIG. 6 is a view for explaining an example of a critical line acquiring process according to an exemplary embodiment of the present disclosure.
Figure 6:
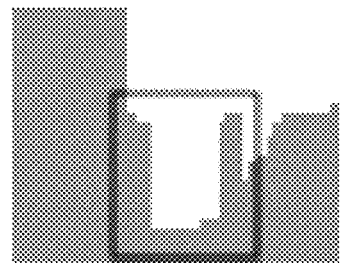
Figure 7:
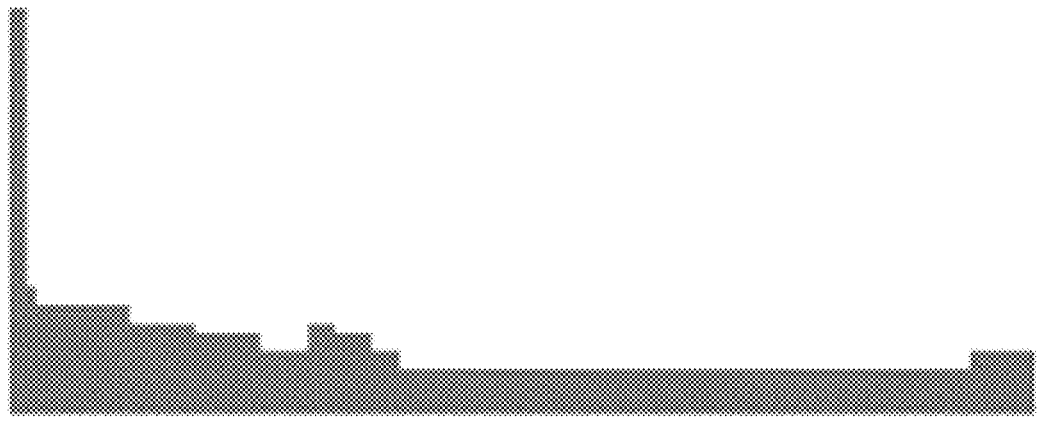
FIG. 7 is a view for explaining another example of a critical line acquiring process according to an exemplary embodiment of the present disclosure.
Figure 7:
Figure 8:
FIG. 8 is a view illustrating an example of a critical line according to an exemplary embodiment of the present disclosure to illustrate a critical line corresponding to the critical point illustrated in FIG. 5.
Figure 9:
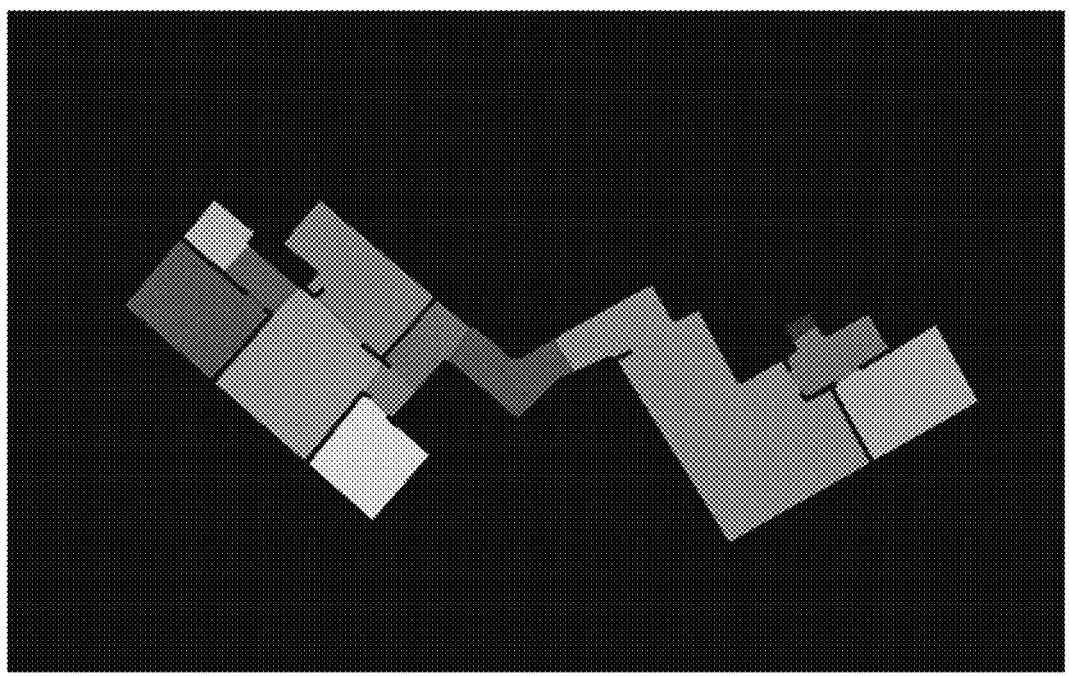
FIG. 9 is a view illustrating an example of a label according to an exemplary embodiment of the present disclosure to illustrate a label corresponding to the critical line illustrated in FIG. 8.
Figure 10:
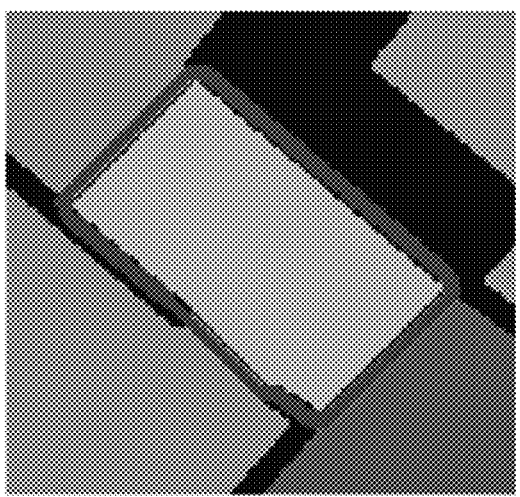
FIG. 10 is a view for explaining an example of a process of acquiring connectivity between labels according to an exemplary embodiment of the present disclosure.
Figure 10:
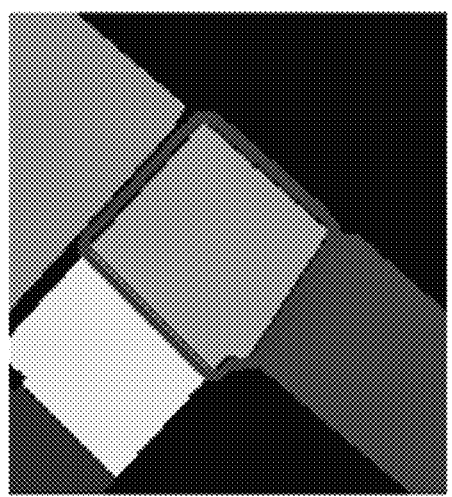
Figure 10:
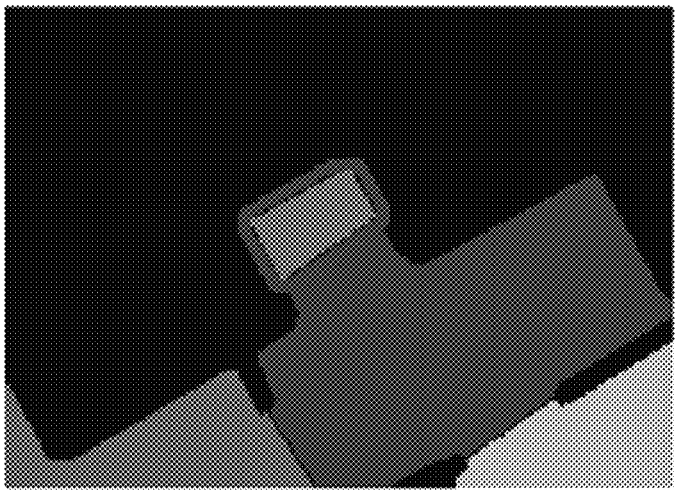
Figure 11:
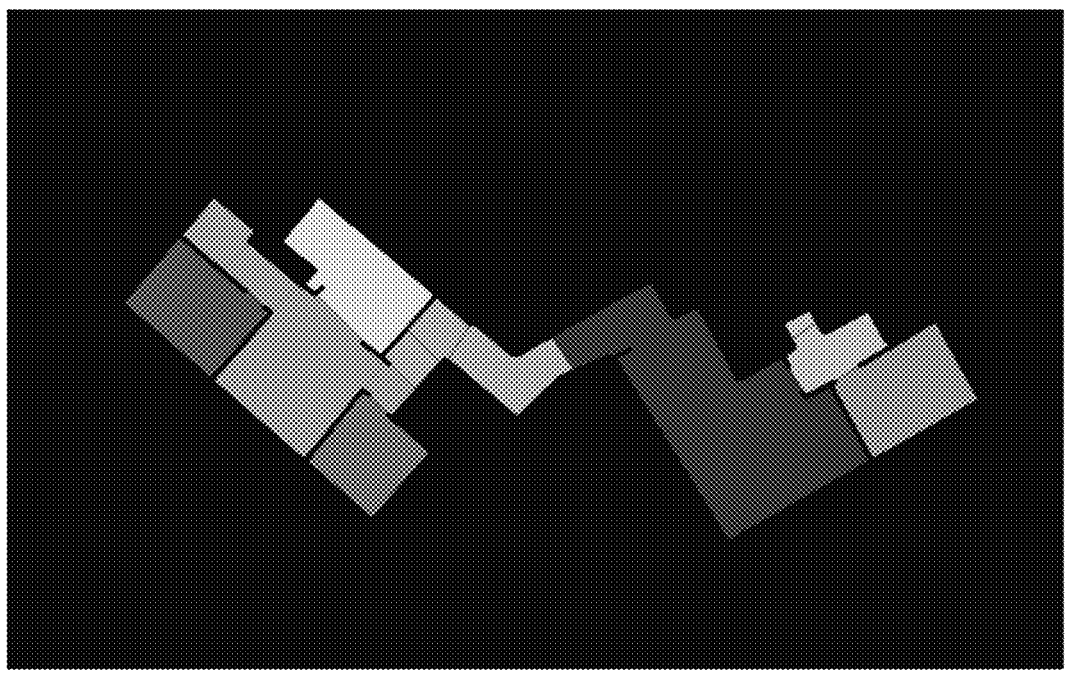
FIG. 11 is a view illustrating an example of a region segmentation result of a grid map according to an exemplary embodiment of the present disclosure to illustrate a region segmentation result corresponding to the label illustrated in FIG. 9.
Figure 12:
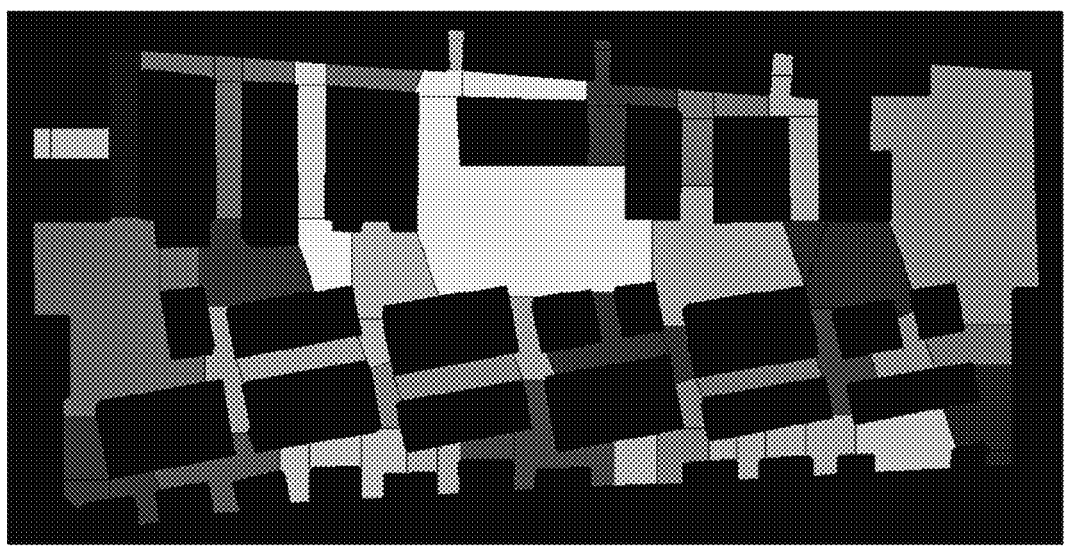
FIG. 12 is a view illustrating another example of a region segmentation result of a grid map according to an exemplary embodiment of the present disclosure.

FIG. 1 is a block diagram illustrating a region segmentation apparatus for map decomposition of a robot according to an exemplary embodiment of the present disclosure; FIG. 2 is a view illustrating an example of a grid map according to an exemplary embodiment of the present disclosure; FIG. 3 is a view illustrating an example of an obstacle distance map according to an exemplary embodiment of the present disclosure to illustrate an obstacle distance map corresponding to the grid map illustrated in FIG. 2; FIG. 4 is a view illustrating an example of an topology according to an exemplary embodiment of the present disclosure to illustrate a topology corresponding to the obstacle distance map illustrated in FIG. 3; FIG. 5 is a view illustrating an example of a critical point according to an exemplary embodiment of the present disclosure to illustrate a critical point corresponding to the topology illustrated in FIG. 4; FIG. 6 is a view for explaining an example of a critical line acquiring process according to an exemplary embodiment of the present disclosure; FIG. 7 is a view for explaining another example of a critical line acquiring process according to an exemplary embodiment of the present disclosure; FIG. 8 is a view illustrating an example of a critical line according to an exemplary embodiment of the present disclosure to illustrate a critical line corresponding to the critical point illustrated in FIG. 5; FIG. 9 is a view illustrating an example of a label according to an exemplary embodiment of the present disclosure to illustrate a label corresponding to the critical line illustrated in FIG. 8; FIG. 10 is a view for explaining an example of a process of acquiring connectivity between labels according to an exemplary embodiment of the present disclosure; FIG. 11 is a view illustrating an example of a region segmentation result of a grid map according to an exemplary embodiment of the present disclosure to illustrate a region segmentation result corresponding to the label illustrated in FIG. 9; and FIG. 12 is a view illustrating another example of a region segmentation result of a grid map according to an exemplary embodiment of the present disclosure.

Referring to FIG. 1, a region segmentation apparatus 100 for map decomposition of a robot according to the exemplary embodiment of the present disclosure (hereinafter, referred to as a "region segmentation apparatus") segments a grid map into a plurality of regions in consideration of the graphic characteristic of the space and obstacles disposed in the space.

In the meantime, the region segmentation apparatus 100 according to the present disclosure is implemented as hardware or software to be loaded in a robot (not illustrated) such as a cleaning robot or a mobile robot. In this case, the region segmentation apparatus 100 loaded in the robot may segment a plurality of regions on the basis of a grid map built while the robot moves. By doing this, the robot may perform an operation such as cleaning in the unit of region, on the basis of the plurality of regions corresponding to the grid map.

To this end, the region segmentation apparatus 100 may include a map building unit 110 and a region segmentation unit 130.

The map building unit 110 may build a grid map.

For example, the map building unit 110 may acquire a two-dimensional grid map as illustrated in FIG. 2 by means of an infrared (IR) sensor, a position sensitive device (PSD) sensor, a 2D light detection ranging (LiDAR) sensor, or a 3D LiDAR sensor. The grid map may be configured by an inner region (a white region of FIG. 2) indicating a space where the robot moves and an outer region (a black region of FIG. 2) indicating a space where the robot cannot move due to an obstacle such as a wall.

The region segmentation unit 130 segments the grid map built by the map building unit 110 into a plurality of regions.

To be more specific, the region segmentation unit 130 includes a critical point acquiring module 131, a critical line acquiring module 133, and a region acquiring module 135.

The critical point acquiring module 131 acquires a critical point on the basis of the grid map.

That is, the critical point acquiring module 131 acquires an obstacle distance map on the basis of a shortest distance of each pixel located in the grid map to an obstacle. For example, in the obstacle distance map, a distance of each pixel of the grid map to the obstacle is displayed with colors for every pixel, as illustrated in FIG. 3. Here, the closer the pixel's color to white, the farther it is from the obstacle.

The critical point acquiring module 131 acquires a topology on the basis of the obstacle distance map.

At this time, the critical point acquiring module 131 acquires points (that is, center points of the obstacle distance map) having the same interval to the obstacles located at the left and the right on the basis of the obstacle distance map and acquires a topology (that is, a frame of the grid map) on the basis of the acquired points. For example, the topology may be configured by lines connecting the points having the same interval to the obstacles located at the left and the right, that is, center points of the obstacle distance map.

The critical point acquiring module 131 acquires a critical point on the basis of the topology.

At this time, the critical point acquiring module 131 acquires an intersecting point (that is, a point where the structure is changed) and an end point on the basis of the topology and acquires the critical point on the basis of the acquired intersecting point and end point. For example, the critical point may include the intersecting points at which lines configuring the topology meet and the end points of the lines configuring the topology, as illustrated in FIG. 5.

The critical line acquiring module 133 acquires a critical line on the basis of the critical point acquired by the critical point acquiring module 131.

That is, the critical line acquiring module 133 acquires the critical line which segments the space on the basis of the critical point using the topology acquired on the basis of the obstacle distance map corresponding to the grid map.

Here, the critical line acquiring module 133 acquires the critical line using a difference between intervals from obstacles located at the left and right, while moving from one critical point to another critical point according to the topology.

For example, the critical line acquiring module 133 may acquire the critical line on the basis of a point at which the difference between the intervals from the obstacles located at the left and the right is larger than a predetermined first reference value. Here, the predetermined first reference value may be set based on a size of the robot in which the region segmentation apparatus 100 according to the present disclosure is loaded and a space size where the robot is utilized. For example, a room door size of a house is normally 700 mm to 900 mm and a size of a household cleaning robot is approximately 350 mm so that it is determined that a place with a width less than three times that of a cleaning robot is a narrowing place. As illustrated in boxes of FIGS. 6A and 6B, a point where the difference between the intervals from the obstacles located at the left and the right is sharply reduced and a point where the difference between the intervals from the obstacles located at the left and the right is sharply increased may be acquired as the critical line. Here, the horizontal axis of FIGS. 6A and 6B indicates a point according to the topology and the vertical axis indicates the difference between intervals from the obstacles located at the left and the right at the corresponding point.

The critical line acquiring module 133 may acquire the critical line on the basis of a start point and an end point at which the difference between intervals from the obstacles located at the left and right is constantly maintained within a predetermined second reference value. Here, the predetermined second reference value may be set based on a size of the robot in which the region segmentation apparatus 100 according to the present disclosure is loaded and a space size where the robot is utilized. As illustrated in FIGS. 7A and 7B, a start point and an end point at which the difference between intervals from the obstacles located at the left and right is constantly maintained may be acquired as the critical line. Here, the horizontal axis of FIGS. 7A and 7B indicates a point according to the topology and the vertical axis indicates the difference between intervals from the obstacles located at the left and the right at the corresponding point.

By doing this, the critical line acquiring module 133 may acquire the critical line as illustrated in FIG. 8. Here, the critical line represented with a bold line illustrated in FIG. 8 represents the critical line acquired on the basis of a point at which the difference between intervals from the obstacles located at the left and right is larger than a predetermined first reference value and the critical line represented with a bold dotted line represents the critical line acquired on the basis of a start point and an end point at which the difference between intervals from the obstacles located at the left and right is constantly maintained within a predetermined second reference value.

The region acquiring module 135 segments the grid map into a plurality of regions on the basis of the critical line acquired by the critical line acquiring module 133.

That is, the region acquiring module 135 acquires a plurality of labels corresponding to the grid map on the basis of the critical line. For example, the region acquiring module 135 may acquire a plurality of labels as illustrated in FIG. 9 using obstacle position information and the critical line corresponding to the grid map. Here, the color of the label illustrated in FIG. 9 is arbitrarily determined to distinguish the labels and the color of the label does not have a specific meaning.

The region acquiring module 135 combines the labels on the basis of the inter-label connectivity to acquire a plurality of regions corresponding to the grid map.

At this time, the region acquiring module 135 acquires adjacent labels while moving an outline of a label among the plurality of labels to acquire the inter-label connectivity. For example, as illustrated in FIGS. 10A to 10C, the region acquiring module 135 may find labels adjacent to the label while moving along the outline of the corresponding label.

Next, the region acquiring module 135 may combine the labels using the inter-label connectivity on the basis of a predetermined combining condition.

Here, the predetermined combining condition may include a first combining condition, a second combining condition, and a third combining condition.

The first combining condition refers to a condition which merges a target label having a size which is smaller than a predetermined minimum size into an adjacent label having a largest adjacent part, among adjacent labels which are adjacent to the target label. Here, the predetermined minimum size may be set based on a size of the robot in which the region segmentation apparatus 100 according to the present disclosure is loaded and a space size where the robot is utilized.

The second combining condition refers to a combining condition which merges the target label into one adjacent label which is adjacent to all the outlines of the target label.

The third combining condition refers to a combining condition which merges the target label into an adjacent label when a size of an adjacent part of the target label and the adjacent label adjacent to the target label is larger than a predetermined reference size. Here, the predetermined reference size may be set based on a size of the robot in which the region segmentation apparatus 100 according to the present disclosure is loaded and a space size where the robot is utilized.

By doing this, the region acquiring module 135 acquires a plurality of regions corresponding to the grid map as illustrated in FIGS. 11 and 12. That is, FIG. 11 illustrates a result of segmenting the plurality of regions on the basis of a grid map acquired for the house, according to the present disclosure and FIG. 12 illustrates a result of segmenting the plurality of regions on the basis of a grid map acquired from a mart space having a large size, according to the present disclosure. Here, the colors of the regions illustrated in FIGS. 11 and 12 are arbitrarily determined to distinguish the regions and the colors of the regions do not have a specific meaning.

At this time, the region acquiring module 135 may acquire region information for each of the plurality of regions corresponding to the grid map. Here, the region information may include region identification information such as a name of the region, connectivity information such as a total area of the corresponding region, a dominant angle of the corresponding region, a centroid of the corresponding region, and region identification information of regions adjacent to the corresponding region, and each point information of a rectangle corresponding to the corresponding region, and point information of an external angle configuring the corresponding region.

As described above, the plurality of labels acquired on the basis of the critical line is segmented in terms of the structural aspect without considering the size. However, when the label is segmented into too small pieces, it is inefficient for the operation of the robot so that the labels are combined in consideration of the size of the label and the connectivity between labels to acquire a plurality of final regions corresponding to the grid map.

Now, a region segmentation methods for map decomposition of a robot according to an exemplary embodiment of the present disclosure will be described with reference to FIGS. 13 and 14.

Figure 13:
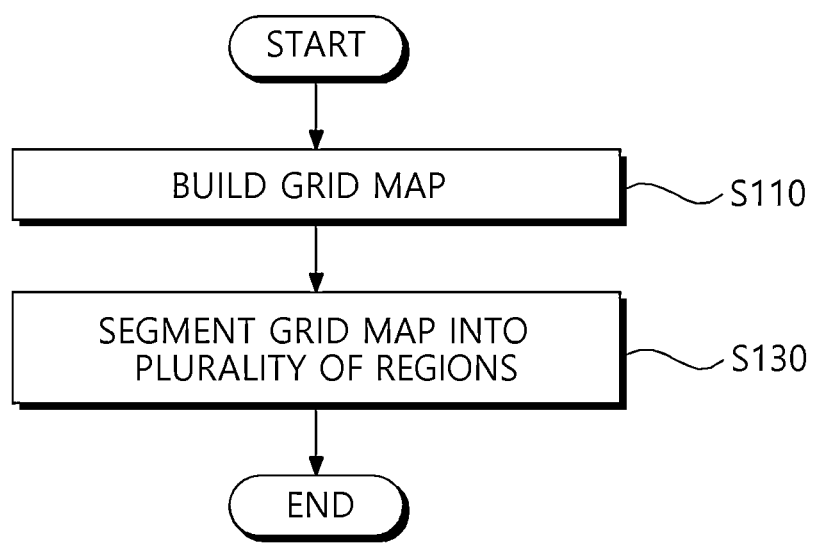
FIG. 13 is a flowchart illustrating a region segmentation method for map decomposition of a robot according to an exemplary embodiment of the present disclosure.

FIG. 13 is a flowchart illustrating a region segmentation method for map decomposition of a robot according to an exemplary embodiment of the present disclosure.

Referring to FIG. 13, the region segmentation apparatus 100 builds a grid map in step S110.

For example, the region segmentation apparatus 100 may acquire a two-dimensional grid map as illustrated in FIG. 2 by means of an infrared (IR) sensor, a position sensitive device (PSD) sensor, a 2D light detection ranging (LiDAR) sensor, or a 3D LiDAR sensor. The grid map may be configured by an inner region (a white region of FIG. 2) indicating a space where the robot moves and an outer region (a black region of FIG. 2) indicating a space where the robot cannot move due to an obstacle such as a wall.

Next, the region segmentation apparatus 100 may segment the grid map into a plurality of regions in step S130.

FIG. 14 is a flowchart for explaining sub steps of a region segmenting step illustrated in FIG. 13.

Referring to FIG. 14, the region segmentation apparatus 100 acquires a critical point on the basis of a grid map in step S131.

That is, the region segmentation apparatus 100 acquires an obstacle distance map on the basis of a shortest distance of each pixel located in the grid map to an obstacle.

The region segmentation apparatus 100 acquires a topology on the basis of the obstacle distance map. At this time, the region segmentation apparatus 100 acquires points (that is, center points of the obstacle distance map) having the same interval to the obstacles located at the left and the right on the basis of the obstacle distance map and acquires a topology (that is, a frame of the grid map) on the basis of the acquired points.

The region segmentation apparatus 100 acquires a critical point on the basis of the topology. At this time, the region segmentation apparatus 100 acquires an intersecting point (that is, a point where the structure is changed) and an end point on the basis of the topology and acquires the critical point on the basis of the acquired intersecting point and end point.

Next, the region segmentation apparatus 100 may acquire a critical line on the basis of the critical point in step S133.

That is, the region segmentation apparatus 100 acquires the critical line which segments the space on the basis of the critical point using the topology acquired on the basis of the obstacle distance map corresponding to the grid map.

Here, the region segmentation apparatus 100 acquires the critical line using a difference between intervals from obstacles located at the left and right, while moving from one critical point to another critical point according to the topology.

For example, the region segmentation apparatus 100 may acquire the critical line on the basis of a point at which the difference between the intervals from the obstacles located at the left and the right is larger than a predetermined first reference value. Here, the predetermined first reference value may be set based on a size of the robot in which the region segmentation apparatus 100 according to the present disclosure is loaded.

The region segmentation apparatus 100 may acquire the critical line on the basis of a start point and an end point at which the difference between intervals from the obstacles located at the left and right is constantly maintained within a predetermined second reference value.

By doing this, the region segmentation apparatus 100 may acquire the critical line as illustrated in FIG. 8.

Next, the region segmentation apparatus 100 may segment the grid map into a plurality of regions on the basis of the critical line in step S135.

That is, the region segmentation apparatus 100 acquires a plurality of labels corresponding to the grid map on the basis of the critical line. For example, the region segmentation apparatus 100 may acquire a plurality of labels as illustrated in FIG. 9 using obstacle position information and the critical line corresponding to the grid map.

The region segmentation apparatus 100 combines the labels on the basis of the inter-label connectivity to acquire a plurality of regions corresponding to the grid map. At this time, the region segmentation apparatus 100 acquires adjacent labels while moving outlines of the plurality of labels to acquire the inter-label connectivity.

Next, the region segmentation apparatus 100 may combine the labels using the inter-label connectivity on the basis of a predetermined combining condition. Here, the predetermined combining condition may include a first combining condition, a second combining condition, and a third combining condition. The first combining condition refers to a condition which merges a target label having a size which is smaller than a predetermined minimum size into an adjacent label having a largest adjacent part, among adjacent labels which are adjacent to the target label. The second combining condition refers to a combining condition which merges the target label into one adjacent label which is adjacent to all the outlines of the target label. The third combining condition refers to a combining condition which merges the target label into an adjacent label when a size of an adjacent part of the target label and the adjacent label adjacent to the target label is larger than a predetermined reference size.

By doing this, the region segmentation apparatus 100 acquires a plurality of regions corresponding to the grid map as illustrated in FIGS. 11 and 12. At this time, the region segmentation apparatus 100 may acquire region information for each of the plurality of regions corresponding to the grid map. Here, the region information may include region identification information such as a name of the region, connectivity information such as a total area of the corresponding region, a dominant angle of the corresponding region, a centroid of the corresponding region, and region identification information of regions adjacent to the corresponding region, and each point information of a rectangle corresponding to the corresponding region, and point information of an external angle configuring the corresponding region.

Even though it has been described above that all components of the exemplary embodiment of the present invention are combined as one component or operate to be combined, the present invention is not limited to the exemplary embodiment. In other words, one or more components may be selectively combined to be operated within a scope of the present invention. Further, all components may be implemented as one independent hardware but a part or all of the components are selectively combined to be implemented as a computer program which includes a program module which performs a part or all functions combined in one or plural hardware. Further, such a computer program may be stored in a computer readable media such as a USB memory, a CD disk, or a flash memory to be read and executed by a computer to implement the exemplary embodiment of the present invention. The recording media of the computer program may include a magnetic recording medium or an optical recording medium.

The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present invention do not limit the technical spirit of the present invention and the scope of the technical spirit of the present invention is not limited by the exemplary embodiments and accompanying drawings. The protection scope of the present invention should be interpreted based on the following appended claims and it should be appreciated that all technical spirits included within a range equivalent thereto are included in the protection scope of the present invention.

What is claimed is:

1. A region segmentation apparatus for map decomposition of a robot, the apparatus comprising:
   a memory; and
   one or more processors coupled to the memory, the one or more processors configured to:
   while the apparatus is moving, obtain information in a space and generate a grid map of the space based on the obtained information, wherein the space includes obstacles; and
   segment the grid map into a plurality of regions on a basis of a critical line which segments the space, wherein intervals from the obstacles located at a left and a right of the critical line are larger than a predetermined first reference value based on a size of the apparatus.

2. The region segmentation apparatus according to claim 1, wherein the one or more processors are configured to:
   acquire a critical point on a basis of the grid map; and
   acquire the critical line on a basis of the critical point.

3. The region segmentation apparatus according to claim 2, wherein the one or more processors are configured to acquire an obstacle distance map on a basis of a shortest distance of each pixel located in the grid map to an obstacle, acquire a topology on a basis of the obstacle distance map, and acquire the critical point on a basis of the topology.

4. The region segmentation apparatus according to claim 3, wherein the one or more processors are configured to acquire points having the same interval to the obstacles located at the left and the right on a basis of the obstacle distance map, acquire the topology on a basis of the acquired points, acquire an intersecting point and an end point on a basis of the topology, and acquire the critical point on a basis of the acquired intersecting point and end point.

5. The region segmentation apparatus according to claim 2, wherein the one or more processors are configured to acquire the critical line which segments the space on a basis of the critical point using the topology acquired on a basis of the obstacle distance map corresponding to the grid map.

6. The region segmentation apparatus according to claim 5, wherein the one or more processors are configured to acquire the critical line using a difference between intervals from obstacles located at the left and right, while the apparatus is moving from one critical point to another critical point along the topology.

7. The region segmentation apparatus according to claim 6, wherein the one or more processors are configured to acquire the critical line on a basis of a start point and an end point at which the difference between intervals from the obstacles located at the left and right is constantly maintained within predetermined second reference value based on the size of the apparatus.

8. The region segmentation apparatus according to claim 2, wherein the one or more processors are configured to acquire a plurality of labels corresponding to the grid map on a basis of the critical line and acquire a plurality of regions corresponding to the grid map by combining the labels on a basis of an inter-label connectivity.

9. The region segmentation apparatus according to claim 8, wherein the one or more processors are configured to acquire a label in an adjacent location, for each of the plurality of labels, while the apparatus is moving along an outline of the label to acquire the inter-label connectivity and combine the labels using the inter-label connectivity on a basis of a predetermined combining condition.

10. The region segmentation apparatus according to claim 9, wherein the predetermined combining condition includes a first combining condition that merges a target label having a size which is smaller than a predetermined minimum size into an adjacent label having a largest adjacent part, among adjacent labels which are adjacent to the target label, a second combining condition which merges the target label into one adjacent label which is adjacent to all the outlines of the target label, and a third combining condition which merges the target label into an adjacent label when a size of an adjacent part of the target label and the adjacent label adjacent to the target label is larger than a predetermined reference size.

11. A region segmentation method for map decomposition of a robot, the region segmentation method comprising:
    while the robot is moving, obtaining information in a space and generating a grid map of the space based on the obtained information, wherein the space includes obstacles; and
    segmenting the grid map into a plurality of regions on a basis of a critical line which segments the space, wherein intervals from the obstacles located at a left and a right of the critical line are larger than a predetermined first reference value based on a size of the robot.

12. The region segmentation method according to claim 11, wherein the segmenting of the grid map into a plurality of regions includes:
    acquiring a critical point on a basis of the grid map; and
    acquiring a critical line on a basis of the critical point.

13. The region segmentation method according to claim 12, wherein in the acquiring of a critical point, an obstacle distance map is acquired on a basis of a shortest distance of each pixel located in the grid map to an obstacle, a topology is acquired on a basis of the obstacle distance map, and the critical point is acquired on a basis of the topology.

14. The region segmentation method according to claim 12, wherein in the acquiring of a critical line, the critical line which segments a space is acquired on a basis of the critical point using a topology acquired on a basis of an obstacle distance map corresponding to the grid map.

15. A computer program product comprising a non-transitory computer readable recording medium having stored thereon a computer program to allow a computer to execute the region segmentation method for map decomposition of a robot according to claim 11.

* * * * *